Dec. 21, 1937. W. MABLE 2,102,597
WINDSHIELD ATTACHMENT
Filed Sept. 12, 1935
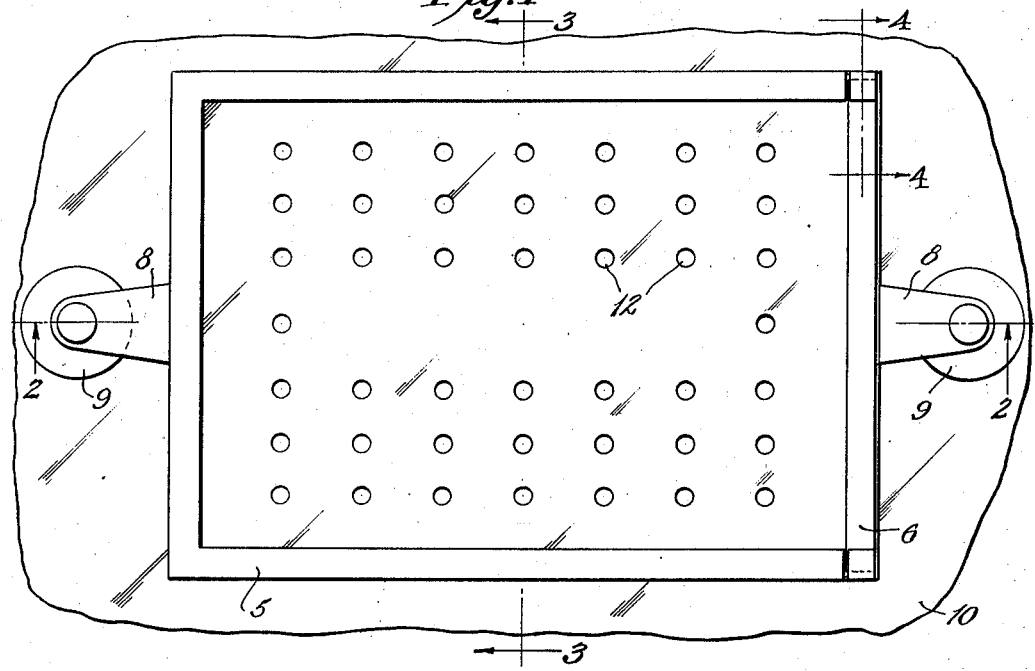
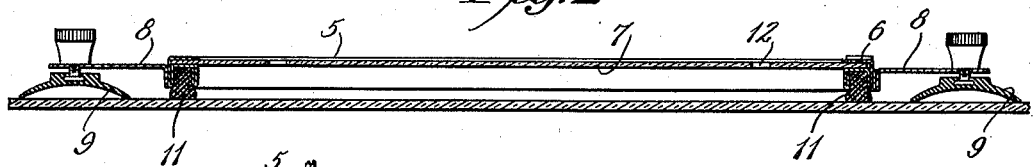
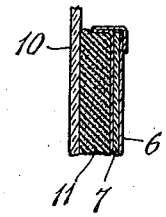
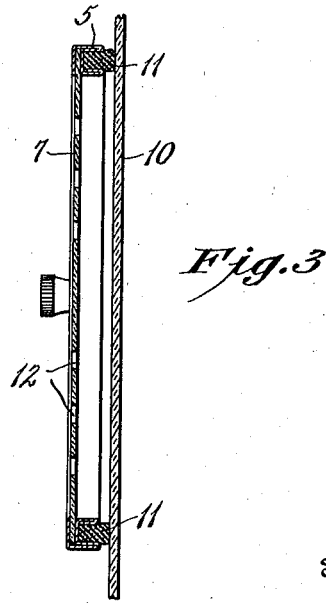
Inventor
William Mable
By Philip P. Liggers
Attorney Patented Dec. 21, 1937

2,102,597

UNITED STATES PATENT OFFICE 2,102,597

WINDSHIELD ATTACHMENT

William Mable, Fort Collins, Colo., assignor of forty-one percent to Winthrop B. Morris, New York, N. Y.

Application September 12, 1935, Serial No. 40,337

1 Claim. (Cl. 20—40.5)

This invention relates generally to windshield attachments, and among other objects, aims to provide an attachment which will prevent frost from forming on a windshield and obscuring the vision of the driver of the car. The invention provides a transparent frost shield which may be attached directly to any glass or other smooth surface, and hence may be used whenever and wherever clear vision in frosty weather through glass or the like is essential.

In the accompanying drawing, showing a preferred embodiment of the invention,—

Fig. 1 is an elevation of the attachment shown mounted on a glass surface such as a windshield;

Fig. 2 is a section on line 2—2 of Fig. 1;

Fig. 3 is a section on line 3—3 of Fig. 1; and

Fig. 4 is an enlarged section on line 4—4 of Fig. 1.

Referring particularly to the drawing, there is shown a frost shield comprising a frame 5, preferably rectangular, with one end 6 readily removable so as to permit insertion and removal of a transparent sheet or pane 7 which is preferably of celluloid. From each end of the frame 5 an arm 8 extends and a vacuum or suction cup 9 is attached to the extremity of each arm 8 to provide means for attaching the shield securely to a smooth surface such as a window or windshield 10, so as to lie in parallelism therewith and yet be readily removable at any time. The frame 5 has a groove or channel on its underside and strips 11 of rubber, felt or the like are secured in said channel and project outwardly to make contact with the windshield or other supporting surface, as shown in Fig. 2. Thus vibration of the frame is eliminated. The transparent celluloid 7 has a multiplicity of perforations 12, preferably round holes.

When the car is driven, the space between the transparent sheet 7 and the windshield is apparently filled with eddies or whirling air currents which move through the perforations 12 and in said space. Whether this is a true explanation of the reason for the phenomenon, observation shows that frost does not form on the outside of the windshield so long as the windshield is protected by the device of the invention.

The device may be used on windshields of locomotives, motorboats, airplanes etc. as well as automobiles.

Obviously the invention may be embodied in various forms neither shown nor described.

Having described a preferred embodiment of the invention, what I claim as new and desire to secure by Letters Patent is:

A device of the character described comprising in combination, a frame; a sheet of transparent perforated material removably held in the frame; means attached to the frame to secure it in parallelism to an automobile windshield or the like; and resilient means mounted on one side of the frame and in contact with the windshield when the frame is secured thereto to seal the space between the frame and the windshield.

WILLIAM MABLE.